UNITED STATES PATENT OFFICE.

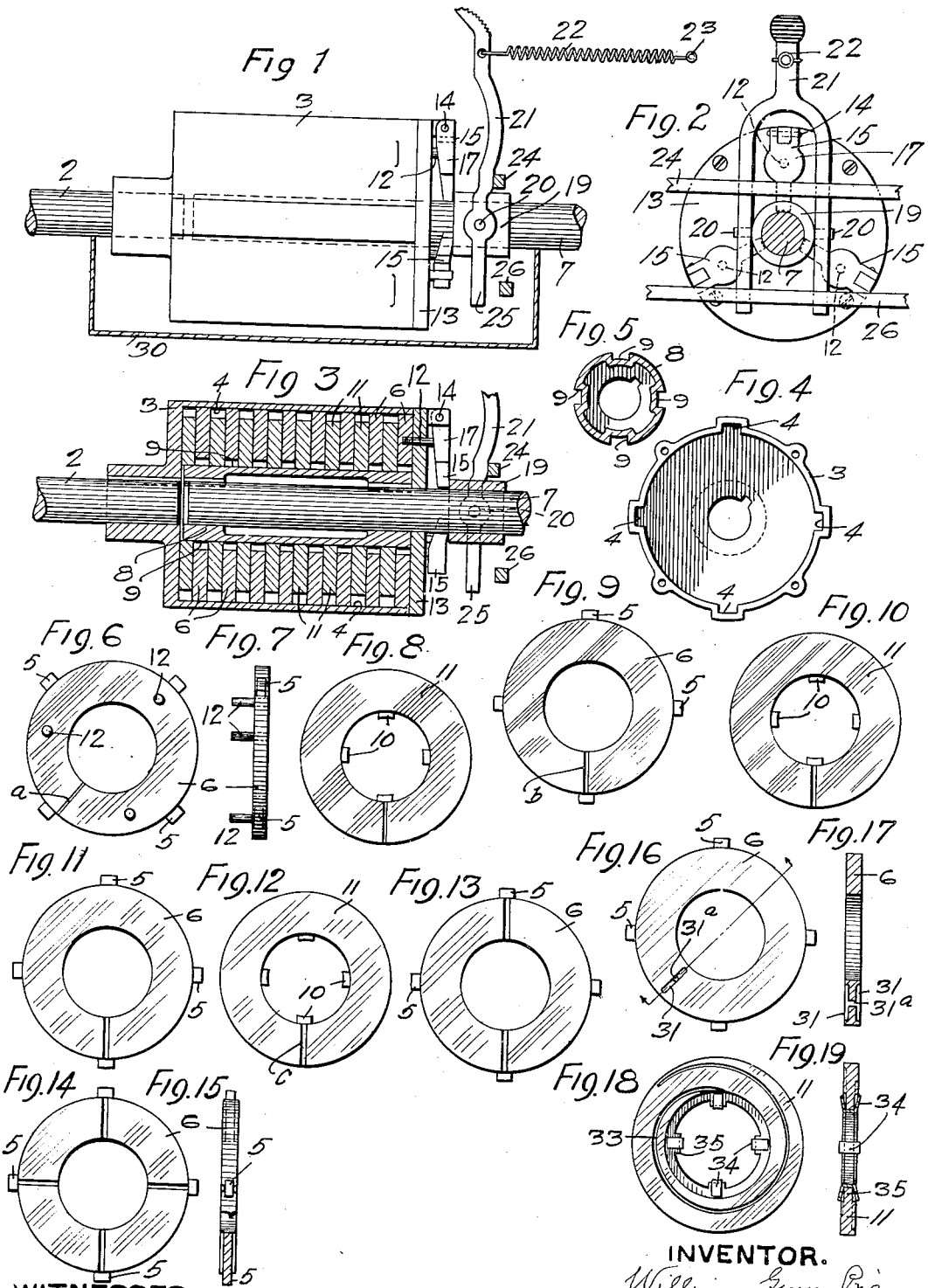

WILLIAM GUNN PRICE, OF NEW CASTLE, PENNSYLVANIA.

FRICTION-CLUTCH.

1,189,176.  Specification of Letters Patent.  Patented June 27, 1916.

Application filed May 27, 1911. Serial No. 629,883.

*To all whom it may concern:*

Be it known that I, WILLIAM GUNN PRICE, a citizen of the United States, and resident of New Castle, in the county of Lawrence and State of Pennsylvania, have invented a new and useful Improvement in Friction-Clutches; and I do hereby declare the following to be a full, clear, and exact description thereof.

My invention relates to friction-clutches, and more especially to that type of friction-clutches in which there are a plurality of disks arranged alternately on the driving and driven shafts with means for bringing the disks into frictional engagement to transmit power from the driving shaft to the driven shaft.

The object of my invention is to provide a friction-clutch of the above type in which I avoid the sudden transmission of the power from the driving shaft to the driven shaft, so that the driven shaft is raised practically instantaneously to the same speed as the driving shaft, which sudden development of speed in the driven shaft creates jars and shocks in the machinery and especially in connection with the driving of automobiles.

To these ends my invention comprises, generally stated, a driving shaft, a driven shaft, a plurality of driving disks and driven disks alternating with each other, and means for bringing said driving disks into driving engagement with said driven disks in succession, whereby the speed of the driven shaft is gradually raised to that of the driving shaft.

In the accompanying drawings Figure 1 is a side elevation of my improved clutch; Fig. 2 is an end view; Fig. 3 is a longitudinal section; Fig. 4 is an end view of the casing on the driving shaft; Fig. 5 a cross section of the sleeve on the driven shaft; Fig. 6 is a face view of the outermost driving disk; Fig. 7 is a side view of same; Figs. 8, 9, 10, 11, 12, 13 and 14 are views of the disks with different widths and numbers of radial grooves; Fig. 15 is an edge view of Fig. 14 partly broken away and in section; Figs. 16 and 17, 18 and 19 show a modified form of my invention.

In connection with the description of my invention I will first refer to a new discovery which I have made in connection with these friction clutches. I have discovered that when two polished disks are brought into contact with a liquid, such as water, between them, the co-efficient of friction with which one disk engages the other will be very much less than when the disk surfaces are dry, and that when water is used as a lubricant on some disk surfaces the co-efficient of friction will be generally as small as 1/10 of 1 per cent.; but when the same disk surfaces are dry and one turning on the other at the same speed as when lubricated, the co-efficient of friction will be nearly 20 per cent. Therefore I believe that water between two polished disks is the most efficient lubricating liquid known as the disks apparently revolve on spherical molecules of water which hold the disk surface out of contact and as the water has practically no viscosity there is practically no friction. The effect of the elimination of friction continues as long as water is supplied in such way that it can get in between the disk surfaces, as would be the case where the lower part of the disks are immersed in water. I also have discovered that when each of the two disks which are in juxtaposition have radial grooves cut in their surfaces the water will escape through these grooves and the co-efficient of friction then becomes practically the same as when the disk surfaces are dry and that this elimination of the lubricating effect of water by the use of the grooves takes place even when the disks are inclosed by a box which is nearly half filled with water. When the grooves are cut in only one of the disks which are in contact, the grooves under such conditions apparently have no effect to eliminate the lubricating effect of the water and this is a phenomenon which I am unable to explain. By cutting only one radial groove across each disk surface and by making this groove very small the water will pass out very slowly so that one disk will revolve on the other a large part of a revolution, or possibly several revolutions, before all the water has escaped, and thus the time required for the disks to come into frictional driving contact is greatly retarded. I have also discovered that the grooves when cut in both disks also reduce the lubricating effect of oils but not in as great a degree as when water or similar liquid is used.

I will now describe my invention with reference to the accompanying drawings in which—

2 designates a driving shaft driven by any suitable engine or motor and keyed to such shaft and rotating therewith is the casing or barrel 3. This barrel is provided with the longitudinally extending grooves 4 to receive the lugs 5 of the driving disks 6.

The driven shaft 7 extends into the barrel 3 and keyed to said shaft is the sleeve 8 with the longitudinally extending groove 9 to receive the lugs 10 formed on the inner peripheries of the rings or disks 11. The disks 6 and 11 are arranged in juxtaposition to each other and alternating with one another, as clearly indicated in Fig. 3 of the drawing. The outermost disk 6 is provided with the studs 12 which project through the end plate 13. Hinged to the end plate 13 by the pins 14 are the swinging members 15. The swinging members 15 have the contacts 17 which are adapted to engage the studs 12 on the outermost driving disk.

A sleeve 19 on the shaft 7 is provided with the lugs 20 which carry the lever 21. The upper end of the lever 21 has the spring 22 attached thereto and the opposite end of said spring is connected to a suitable support 23. A stop 24 is provided against which the lever 21 rests when in the normal position of said lever. The lower end 25 of the lever is adapted to bear against the stop 26 when the upper end of the lever is pushed forward as fully hereinafter set forth. The spring 22 normally holds the disks 6 and 11 in frictional contact and this can be increased by forcing the lever 21 forward until the lower end thereof bears against the stop 26. The sleeve 19 operates against the swinging member 15 and through the studs 12 forces the outermost driving disk inward and so forces all of the disks into frictional working contact.

As stated above, I have discovered that by forming a groove or other outlet in the face of the disks I provide for the escape of the lubricant from between the disks and thereby increase the friction. The greater the number of grooves in the disks the sooner the liquid between the same will be expelled and the friction between the disks developed to the full extent. Accordingly I arrange to have some of the disks with very narrow radially extending grooves, as a, Fig. 6, and may greatly increase the width of these grooves, as b Fig. 9, or c Fig. 12; or I may employ several grooves as in Fig. 14. In this way it will be apparent that when the disks are forced into contact by the spring 22 or by pressure applied to the foot lever 21, the liquid in the box 30 in which the shell 3 revolves, and which works its way between the disks, will be more readily expelled from between the disks with the greater number of grooves or those having the wider grooves. The heavy pressure exerted by the manual movement of the lever 21 will expel the lubricating liquid from between the disks much quicker than the light pressure created by the spring 22, and consequently the clutch will act more quickly under the heavy pressure, and this will be employed in case of emergency.

In Fig. 16 I have illustrated a modified form of my invention in which the disks are provided with the radial groove, or grooves, 31, which do not extend quite to either the outer or inner edges of the disk so no lubricating liquid can readily escape in that way. The hole 31ᵃ is provided which passes through the disk and connects the grooves as shown in Fig. 17. By thus providing all the disks with such grooves and holes, except that either or both of the disks at the ends of the clutch are provided with radial grooves cut clear to the edge as at a, Fig. 6, I obtain a very slow means of exit for the lubricating fluid, so that the friction torque of the clutch will build up very slowly and require a number of revolutions of the driving shaft before the full driving power of said shaft is transmitted to the driven-shaft.

In Fig. 18 I have shown a spiral groove 33. Spring clips 34 are adapted to engage the lugs 35 and said springs with said lugs engage the grooves 9 of the sleeve 8 and are held in place by said grooves. These springs contact with the plane faces of the juxtaposed disks 6 and act to separate or force said disks apart when the action of the spring 22 is overcome.

By providing for the escape of the liquid between the disks more readily in the case of some disks than others it is apparent that the speed of the shaft 2 will be transmitted gradually to the shaft 7 as the several pairs of disks gradually develop the requisite friction to transmit the rotary movement from the driving disk to the driven disk and the disks accordingly operate in succession instead of all developing their ultimate friction at practically one and the same moment.

By my invention it is possible to start an automobile on high gear with a slow acceleration which will not strain the shaft or gears or cause the sudden starting and unpleasant jolt to the passengers. This will enable me to dispense with using intermediate and low gears and avoid changing gears when the shaft is turned, which frequently results in the stripping of the gears. My improved clutch will also make the shock and strain much less when starting with either the intermediate or the low gears.

My invention is applicable for many different uses, such as between the gas engine shaft and the propeller shaft in large motor boats and I do not wish to limit its use in any manner whatsoever.

What I claim is:

1. In a friction-clutch, a driving-shaft, a driven-shaft, a plurality of driving-disks and driven-disks carried by said shafts and alternating with each other, means for bringing said disks into contact with each other, and a groove formed in each disk to permit of the escape of a lubricant from between all parts of said disks.

2. In a friction-clutch, a driving-shaft, a driven-shaft, a plurality of driving-disks and driven-disks carried by said shafts and alternating with each other, means for bringing said disks into contact with each other, and a groove formed in each disk to permit of the escape of a lubricant from between all parts of said disks.

3. In a friction-clutch, a driving-shaft, a driven-shaft, a plurality of driving-disks and driven-disks carried by said shafts and alternating with each other, means for bringing said disks into contact with each other, said disks having radial grooves formed in and extending the full width of their contacting-surfaces.

4. In a friction-clutch, a driving-shaft, a driven-shaft, a plurality of driving-disks and driven-disks carried by said shafts and alternating with each other, and means for bringing said disks into frictional contact, said disks having grooves formed in their contacting surfaces, the grooves in said disks varying in width.

5. In a friction-clutch, a driving-shaft, a driven-shaft, a plurality of driving-disks and driven-disks carried by said shafts and alternating with each other, means for bringing said disks into frictional contact with each other, grooves formed in the frictional surfaces of said disks, the grooves in said disks varying in number.

6. In a friction-clutch, a driving-shaft, a casing on said shaft, a plurality of driving disks engaging said casing to rotate therewith, a driven-shaft, a plurality of driven-disks connected to said driven-shaft to rotate therewith and alternating with said driving disks, means for forcing said disks into frictional contact, means for supplying a lubricant continuously to said disks, and means for eliminating the effect of said lubricant between and throughout the faces of said disks when forced into contact.

7. In a frictional-clutch, a driving-shaft, a casing carried by said shaft to rotate therewith, said casing having longitudinal grooves therein, a plurality of driving disks having lugs engaging said grooves, a driven shaft, a sleeve secured to said shaft extending within said casing, said sleeve having longitudinally extending grooves therein, a plurality of driven disks having lugs engaging said grooves and alternately arranged with reference to said driving disks, means for forcing said disks into contact, means for supplying a lubricant to said disks, and means for eliminating the effect of said lubricant between and throughout the faces of said disks when forced into contact.

8. In a friction-clutch, a driving-shaft, a plurality of disks carried thereby, a driven-shaft, a plurality of disks carried thereby, said disks alternating with each other, means for supplying a lubricant thereto, means for forcing said disks into contact, and means for permitting the escape of said lubricant at a variable rate from between the successive pairs of frictional surfaces.

9. In a friction-clutch, a driving-shaft, a plurality of disks carried thereby, a driven-shaft, a plurality of disks carried thereby, said disks alternating with each other, means for supplying a lubricant thereto, means for forcing said disks into contact, and means for permitting the escape of said lubricant at a decreasing variable rate from between the successive pairs of frictional surfaces.

10. A friction clutch comprising a driving-shaft, a plurality of driving disks and driven disks alternating with each other, and means for increasing the friction between pairs of said disks at a decreasing variable rate.

In testimony whereof, I, the said WILIAM GUNN PRICE have hereunto set my hand.

WILLIAM GUNN PRICE.

Witnesses:
ROBERT C. TOTTEN,
JOHN F. WILL.